(12) United States Patent
Hoppe et al.

(10) Patent No.: US 11,945,311 B2
(45) Date of Patent: Apr. 2, 2024

(54) SHIFTING DEVICE FOR A HYBRID DRIVE SYSTEM OF A MOTOR VEHICLE, DRIVE SYSTEM, AND MOTOR VEHICLE

(71) Applicant: Schaeffler Technologies AG & Co. KG, Herzogenaurach (DE)

(72) Inventors: Marcus Hoppe, Achern (DE); Torsten Pieper, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 367 days.

(21) Appl. No.: 17/603,778

(22) PCT Filed: Mar. 17, 2020

(86) PCT No.: PCT/DE2020/100208
§ 371 (c)(1),
(2) Date: Oct. 14, 2021

(87) PCT Pub. No.: WO2020/211894
PCT Pub. Date: Oct. 22, 2020

(65) Prior Publication Data
US 2022/0176797 A1 Jun. 9, 2022

(30) Foreign Application Priority Data
Apr. 16, 2019 (DE) .......................... 102019110044.5

(51) Int. Cl.
*F16D 11/14* (2006.01)
*B60K 6/365* (2007.10)
(Continued)

(52) U.S. Cl.
CPC .............. *B60K 6/387* (2013.01); *B60K 6/365* (2013.01); *B60K 6/442* (2013.01); *B60K 20/02* (2013.01);
(Continued)

(58) Field of Classification Search
CPC ................ F16H 2003/0815–2003/0826; F16H 2200/2094; F16H 2200/2064;
(Continued)

(56) References Cited

U.S. PATENT DOCUMENTS 3,481,437 A * 12/1969 Noboru ................... F16D 11/10
192/85.48
5,862,900 A * 1/1999 Sailler, Jr. ............... F16D 21/04
192/114 R
(Continued)

FOREIGN PATENT DOCUMENTS

DE 102011085201 5/2013
DE 102017200724 7/2018
(Continued)

*Primary Examiner* — Ernesto A Suarez
*Assistant Examiner* — Lillian T Nguyen
(74) *Attorney, Agent, or Firm* — Volpe Koenig

(57) ABSTRACT

A shifting device for a hybrid drive system of a motor vehicle, with a centrally arranged shaft, a first gear wheel rotatably mounted relative to the shaft and a second gear wheel rotatably mounted relative to the shaft and offset along the shaft relative to the first gear wheel, a sliding sleeve slidably received directly in the first gear wheel and non-rotatably connected thereto, which sliding sleeve is configured such that, in a first displacement position, it connects the shaft in a rotationally fixed manner to the first gear wheel, while the second gear wheel is rotationally decoupled from the shaft, and in a second displacement position, it rotationally connects the shaft to both the first and second gear wheels, and in a third displacement position, it rotationally connects the two gear wheels to each other while the shaft is rotationally decoupled from the two gear wheels.

20 Claims, 4 Drawing Sheets

(51) Int. Cl.
 *B60K 6/387* (2007.10)
 *B60K 6/442* (2007.10)
 *B60K 20/02* (2006.01)
 *F16H 63/30* (2006.01)
(52) U.S. Cl.
 CPC ...... *F16H 63/3013* (2013.01); *B60Y 2200/92* (2013.01)
(58) Field of Classification Search
 CPC ......... F16D 11/00–14; F16D 21/00–08; B60K 6/36–40
 See application file for complete search history.

(56) References Cited

U.S. PATENT DOCUMENTS

| | | | | |
|---|---|---|---|---|
| 2003/0100395 A1* | 5/2003 | Hiraiwa | ............... | B60K 6/445 903/910 |
| 2010/0199799 A1* | 8/2010 | Gumpoltsberger | ..... | F16D 21/04 74/491 |
| 2013/0334000 A1* | 12/2013 | Gerauer | ............... | F16D 27/108 192/69.7 |
| 2014/0026699 A1* | 1/2014 | Kunze | ............... | F16H 3/087 74/373 |
| 2015/0107954 A1* | 4/2015 | Baur | ............... | F16D 27/004 192/69 |
| 2016/0160938 A1* | 6/2016 | Wooden | ............... | F16D 25/061 192/69 |
| 2016/0167503 A1* | 6/2016 | Lee | ............... | B60K 6/387 903/910 |
| 2020/0263740 A1* | 8/2020 | Chae | ............... | F16H 37/0813 |
| 2022/0176801 A1* | 6/2022 | Hoppe | ............... | B60K 6/36 |

FOREIGN PATENT DOCUMENTS

| | | | | |
|---|---|---|---|---|
| DE | 102017206510 | | 10/2018 | |
| DE | 102017127577 | A1 * | 5/2019 | ............. B60K 6/387 |
| GB | 2445838 | | 7/2008 | |
| WO | 2004106096 | | 12/2004 | |

* cited by examiner

| | Combustor | Generator | Output |
|---|---|---|---|
| Serial drive | ● | ● | |
| Electric drive from battery | | ● | ● |
| Internal combustion engine drive | ● | ● | ● |
| Stationary charge | ● | ● | |

SHIFTING DEVICE FOR A HYBRID DRIVE SYSTEM OF A MOTOR VEHICLE, DRIVE SYSTEM, AND MOTOR VEHICLE

CROSS-REFERENCE TO RELATED APPLICATIONS

This application is the U.S. National Phase of PCT Appln. No. PCT/DE2020/100208, filed Mar. 17, 2020, WHICH CLAIMS PRIORITY FROM German Patent Application No. 10 2019 110 044.5, filed Apr. 16, 2019, the entire disclosures of which are incorporated by reference herein.

TECHNICAL FIELD

The disclosure relates to a shifting device for a hybrid drive system of a motor vehicle. Furthermore, the disclosure relates to the drive system per se with this shifting device as well as to a motor vehicle with the drive system, wherein the drive system is preferably implemented as a serial hybrid drive. The drive system also typically has two electric motors, of which a first electric motor is mainly used as a generator and a second electric motor is mainly used as a drive motor. The drive system further comprises a transmission unit that operatively connects an output shaft of an internal combustion engine, the electric motors, and an output-side drive member.

BACKGROUND

Generic drive systems are already sufficiently known in the prior art. For example, DE 10 2017 206 510 A1 discloses a transmission structure for a series/parallel hybrid vehicle.

Drive systems are thus already known which allow a "serial" hybrid to be implemented, whereby the internal combustion engine is driven directly to the drive wheels of the motor vehicle. However, in the designs known from the prior art, at least some of the following disadvantages frequently occur. The drive systems known from the prior art limit the maximum speed of the motor vehicle. The corresponding vehicle can therefore usually only realize a maximum speed of about 180 km/h. These drive systems are hardly suitable or even unsuitable for more powerful engines and/or higher vehicle classes. Another disadvantage is that the known transmission structure of the drive system means that both electric motors rotate at top speed when the main drive is provided by the internal combustion engine. As a result, the electric motors generate relatively high drag losses at high driving speeds. This in turn results in the need to find a design compromise between maximum speed and maximum wheel torque with regard to the electric motors. Furthermore, this means that only limited trailer operation is possible with the vehicle. In addition, the electric motors are usually coupled to the internal combustion engine with a gear ratio that is unfavorable for serial operation. Another disadvantage in known designs is that the two front electric motors are usually arranged axially in a row next to each other, which is problematic in the front-transverse design of the internal combustion engine and especially in small vehicles.

SUMMARY

It is therefore the object of the present disclosure to overcome the disadvantages known from the prior art and, in particular, to provide a drive system which is improved in terms of its efficiency, enables travel at high speeds and has a compact design.

This is achieved according to the disclosure by a shifting device with one or more of the features disclosed herein. Thus, a shifting device for a hybrid drive system of a motor vehicle is provided. The shifting device has a centrally arranged shaft, a first gear wheel rotatably mounted relative to the shaft, and a second gear wheel rotatably mounted relative to the shaft and arranged along the shaft, offset from the first gear wheel. In addition, the shifting device has a sliding sleeve which is received directly in the first gear wheel in a displaceable manner and is connected to the first gear wheel in a rotationally fixed manner, which sliding sleeve is configured in such a way that, in a first displacement position, it connects the shaft to the first gear wheel in a rotationally fixed manner, while the second gear wheel is rotationally decoupled from the shaft, in a second displacement position, it rotationally connects the shaft both to the first gear wheel and to the second gear wheel, and in a third displacement position, it rotationally connects the two gear wheels to one another while the shaft is rotationally decoupled from the two gear wheels.

By using the shifting device, the gear ratios of the two electric motors can be selected independently of each other in a gear unit. Furthermore, optimized map matching between an internal combustion engine and a first electric motor, which mainly acts as a generator, is facilitated by a separate gear stage. The shifting device also provides a means of operating the motor vehicle much more efficiently. Higher speeds, e.g., top speeds of 250 km/h, are also possible as a result. Also, a second electric motor forming a traction motor/drive motor can be easily "jettisoned" at higher speeds to avoid drag losses. The second electric motor can also be simply configured to the maximum wheel torque, whereby the wheel torque can also be configured for trailer operation.

Further advantageous embodiments are disclosed in the claims and explained in more detail below.

Therefore, it is also advantageous if the sliding sleeve has a detent contour in which a detent element (of a detent unit) lockingly engages in the respective displacement position. This further improves the function of the shifting device.

In this context, it is also expedient if the detent element is received in the first gear. This makes the shifting device even more compact.

It is also advantageous that the sliding sleeve has a first connection area cooperating with the shaft and a second connection area cooperating with the second gear and arranged axially cross-linked to the first connection area. This enables a particularly compact design of the sliding sleeve.

Furthermore, it is expedient if a (first) transmission portion of the shaft that can be coupled to the first connection portion is arranged toward a first axial side of the first gear, and a (second) transmission portion of the second gear that can be coupled to the second connection portion is arranged toward a second axial side of the gear that faces away from the first axial side.

A particularly reliable function of the shifting device is provided if an actuator, preferably implemented as a linear motor, acts on the sliding sleeve in a displacing manner via a lever mechanism.

In this respect, it is also expedient if a lever element of the lever mechanism engages with a first end in a receiving contour on the sliding sleeve and can be acted upon with a second end opposite the first end by the actuator for pivoting about a pivot point fixed to the housing.

Furthermore, the disclosure relates to a drive system for a hybrid motor vehicle, such as a passenger car, a truck, a bus or another commercial vehicle, which drive system comprises a motor shaft which can be coupled or is coupled in a rotational manner to an output shaft of an internal combustion engine, a first electric motor which has a first rotor shaft and is operated as a generator in a main operating state, a second electric motor which has a second rotor shaft which is arranged radially offset with respect to the first rotor shaft and is operated as a drive motor in the main operating state, a second electric motor which has a second rotor shaft which is arranged radially offset with respect to the first rotor shaft and is operated as a drive motor in the main operating state a second electric motor having a second rotor shaft, arranged radially offset from the first rotor shaft and operated as a drive motor in the main operating state, a drive part connected in rotation to the second rotor shaft and connectable in rotation to at least one wheel of the motor vehicle, and a shiftable transmission unit inserted to act between the motor shaft, the two rotor shafts and the drive part. In addition, a shifting device according to the disclosure, which controls a shift position of the transmission unit and is configured according to at least one of the embodiments described above, is inserted between the motor shaft, a first gear wheel permanently coupled in rotation to the first rotor shaft, and a second gear wheel permanently coupled in rotation to the second rotor shaft via an additional planetary gear stage, acting in such a way that, in a first shift position, the shifting device connects the motor shaft to the first rotor shaft, while in a second shift position, the second rotor shaft is decoupled in rotation from the motor shaft, in a first shifting position, the shifting device rotationally connects the motor shaft to the first rotor shaft, while the second rotor shaft is rotationally decoupled from the motor shaft, in a second shifting position, the shifting device rotationally connects the motor shaft to both the first rotor shaft and the second rotor shaft, and in a third shifting position, the shifting device rotationally connects the two rotor shafts to one another, while the motor shaft is rotationally decoupled from the two rotor shafts.

Furthermore, it is advantageous that the planetary gear stage is formed by a planetary gear unit, of which a sun gear is permanently connected directly to the second rotor shaft, a planet carrier supporting several planet gears is connected to an intermediate gear wheel which is in mesh with the second gear wheel, and an internal gear can be arranged/supported fixed to the vehicle frame by means of a brake device. This means that the second electric motor can be expediently controlled.

Furthermore, the disclosure relates to a (hybrid) motor vehicle with the drive system according to at least one of the embodiments described above, wherein the drive part is rotationally coupled to the wheels of the motor vehicle.

A particularly efficient design of the motor vehicle is ensured if the internal combustion engine is arranged with its output shaft transverse to a longitudinal axis (of the motor vehicle) of the vehicle and/or the drive part is rotationally coupled to wheels of a drive axle.

In other words, according to the disclosure, a shifting device is thus realized on a transmission input shaft or intermediate shaft (shaft) for a hybrid structure. The shifting element (shifting device) has two synchronizing units with the corresponding synchronizing gears, whereby a shifting sleeve (sliding sleeve) is coupled to an actuator and has a latch (latching unit) for different shifting positions. The elements of the interlock are integrated in a gear wheel, which is coupled with the generator.

BRIEF DESCRIPTION OF THE DRAWINGS

The disclosure will now be explained in more detail with reference to figures, in which context various exemplary embodiments are also shown.

In the figures.

DETAILED DESCRIPTION

The figures are only schematic in nature and serve only for understanding the disclosure. The same elements are provided with the same reference symbols. Also, the different features of the various embodiments can in principle be freely combined with each other.

Figure 1:
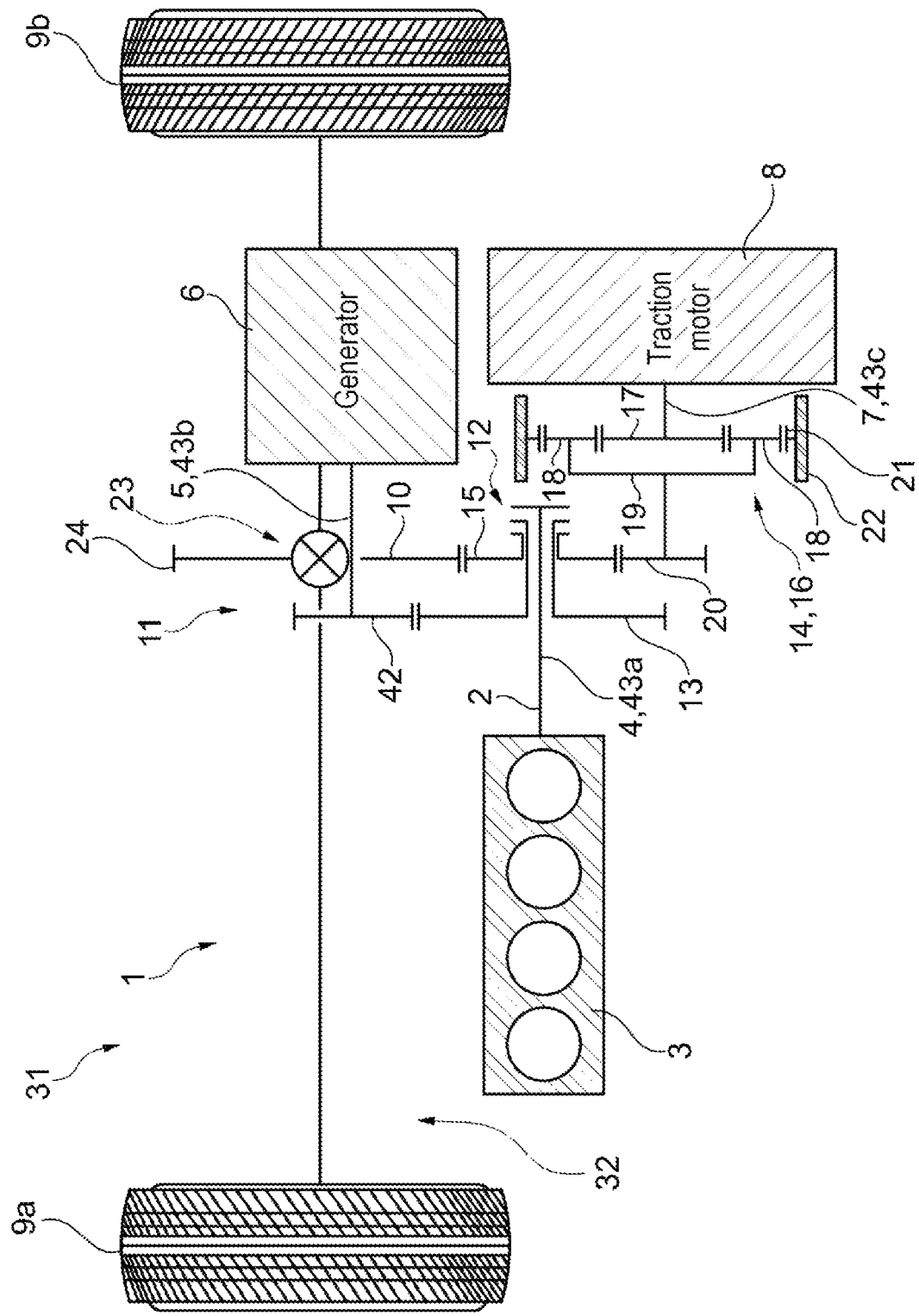
FIG. 1 is a schematic sectional view of a drive system according to a first embodiment of the disclosure, in which the structure of a transmission unit coupling an internal combustion engine and two electric motors to a drive part of a differential gear can be seen particularly well.

Referring first to FIG. 1, a drive system 1 according to a preferred first embodiment is illustrated. The drive system 1 is integrated in a hybrid motor vehicle, which motor vehicle is indicated by the reference number 31. In particular, in this embodiment a drive axle 32 of the motor vehicle 31 (here front axle, alternatively also rear axle) is also shown, wherein wheels 9a, 9b of the drive axle 32 can be driven via various machines (internal combustion engine 3 as well as electric motors 6, 8) of the drive system 1. In this embodiment, an internal combustion engine 3 of the drive system 1 is located in a preferred front-transverse arrangement in which a longitudinal axis of the internal combustion engine 3, i.e., a (first) axis of rotation 43a of an output shaft 2 (crankshaft) of the internal combustion engine 3 is oriented transversely, in this case perpendicularly, to a longitudinal axis (vehicle longitudinal axis) of the motor vehicle 31.

According to the configuration of the drive system 1 as a serial hybrid drive, the drive system 1 also has two electric motors 6, 8 in addition to the internal combustion engine 3. A first electric motor 6 is designated as a generator in FIG. 1 and is therefore used as a generator in a main operating state. However, the first electric motor 6 can in principle be switched as a drive motor, for example for purely electric reversing. A second electric motor 8, which consumes an electric power generated by the first electric motor 6, is implemented as a drive motor/travel motor.

The two electric motors 6, 8 are arranged with rotary axes 43b, 43c of their rotor shafts 5, 7 offset from each other in the radial direction. The first electric motor 6 has a first rotor shaft 5 which is rotatably mounted about a (second) axis of rotation 43b. The second electric motor 8 has a second rotor shaft 7 which is rotatably mounted about a (third) axis of rotation 43c. The first electric motor 6 is arranged as a whole, i.e., also together with its stator, which is not shown here for the sake of clarity, and its rotor, which is arranged rotatably relative to the stator and is connected fixedly in terms of rotation to the first rotor shaft 5, offset in the radial direction of the second axis of rotation 43b relative to the entire second electric motor 8 together with its stator and its rotor, which is arranged rotatably relative to the stator and is connected fixedly in terms of rotation to the second rotor shaft 7. The two electric motors 6, 8 are also arranged radially offset relative to the first axis of rotation 43a of the output shaft 2 of the internal combustion engine 3. Viewed along the longitudinal axis of the vehicle, the first axis of rotation 43a is located between the second axis of rotation 43b and the third axis of rotation 43c.

Figures 3, 4:
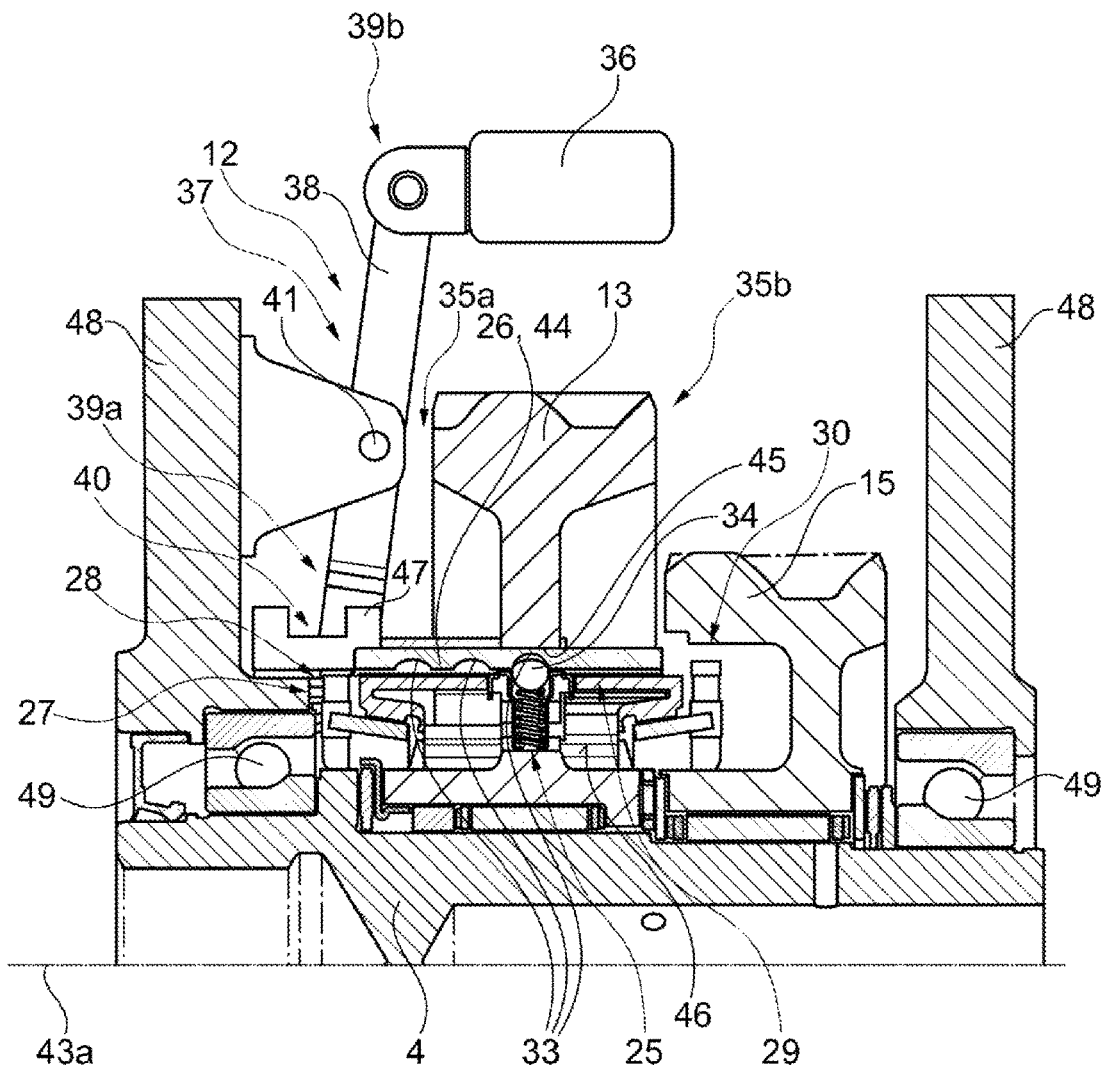
FIG. 3 is a longitudinal sectional view of a shifting device implemented according to a preferred embodiment example and used in the respective drive system of FIGS. 1 and 2, wherein a sliding sleeve that specifies the shifting position of the shifting device is in a first displacement position in which a central motor shaft is rotationally connected to a first gear wheel coupled to a first electric motor.
FIG. 4 is a diagram illustrating different operating conditions that can be implemented by the drive systems of FIGS. 1 and 2.

A gear unit 11 is provided between the internal combustion engine 3/the output shaft 2, the two electric motors 6, 8 with their two rotor shafts 5, 7 and a drive part 10 of the drive system 1 to convert the different operating states of the drive system 1 indicated in FIG. 4. The transmission unit 11 is implemented as a manual transmission and can be moved to different shift positions to convert the various operating states. The transmission unit 11 is controlled by a shifting device 12 according to the disclosure, which is described below with reference to FIGS. 3, 5 and 6 in more detail.

The gear unit 11 has a centrally arranged motor shaft 4 (also simplified as shaft), which is coupled to the output shaft 2 in a rotationally fixed manner or is directly implemented by a region of the output shaft 2. The motor shaft 4 is arranged coaxially with the output shaft 2 and thus rotatable about the common first axis of rotation 43a. The gear unit 11 also has a first gear wheel 13, which first gear wheel 13 is permanently connected/coupled to the first rotor shaft 5 in a rotationally fixed manner. The first gear wheel 13 is arranged coaxially to the motor shaft 4. The first gear wheel 13 is designed as a hollow shaft gear wheel/hollow shaft and is rotatably mounted radially from the outside on the motor shaft 4. To connect the first gear wheel 13 to the first rotor shaft 5 in a rotationally fixed manner, a further (third) gear wheel 42 is provided, which third gear wheel 42 is arranged on the first rotor shaft 5 in a rotationally fixed manner and is in meshing engagement with the first gear wheel 13. The third gear 42 is also considered to be part of the gear unit 11.

Furthermore, the gear unit 11 has a second gear wheel 15, which second gear wheel 15 serves for coupling with the second rotor shaft 7. The second gear 15 is arranged adjacent to the first gear 13 in the axial direction of the motor shaft 4, i.e., as viewed along the first axis of rotation 43a. The second gear wheel 15 is also implemented as a hollow shaft gear wheel/hollow shaft and is rotatably mounted radially from the outside on the motor shaft 4. In this embodiment, the second gear 15 is connected to a planetary gear stage 14 via an intermediate gear 20. The planetary gear stage 14 is further rotationally connected to the second rotor shaft 7. As can further be seen from FIG. 1, the intermediate gear 20 meshing with the second gear 15 is directly connected in a rotationally fixed manner to a planet carrier 19 of the planetary gear stage 14 forming a planetary splitter gear 16. The planetary splitter gear 16 of the gear unit 11 further comprises, in a typical manner, a sun gear 17 which is directly connected to the second rotor shaft 7 in a rotationally fixed manner. Several planetary gears 18, which are distributed in the circumferential direction and rotatably mounted on the planet carrier 19, are in mesh with the sun gear 17. A ring gear 21, which continues to mesh with the planet gears 18, cooperates with a braking device 22. The brake device 22, which is fixed to the housing, i.e., fixed to the vehicle frame, holds the ring gear 21 relative to a vehicle frame in its activated state. In its deactivated state, free rotation of the ring gear 21 relative to the vehicle frame is enabled, so that the brake device 22 releases the ring gear 21 rotationally.

In the first embodiment, the second gear 15 is also in non-rotational engagement with the drive part 10. The drive part 10 has teeth 24 with which the second gear 15 is in meshing engagement. The drive part 10 is designed here as an input gear of a differential gear 23 of the drive axle 32. The drive part 10 is thus permanently connected in rotation to the two wheels 9a, 9b of the motor vehicle 31 shown.

Figure 5:
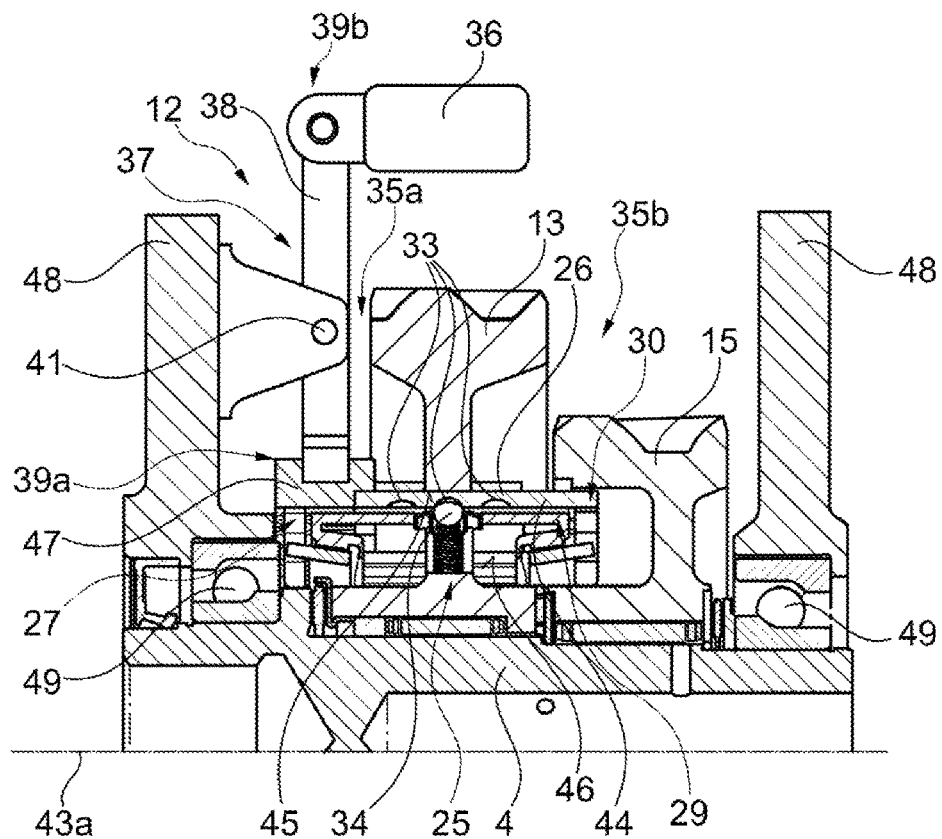
FIG. 5 is a longitudinal sectional view of the shifting device, similar to FIG. 3, wherein the sliding sleeve is in a second displacement position, which is changed compared to FIG. 3, in which second displacement position both the motor shaft and a second gear wheel coupled to a second electric motor are rotationally connected to the first gear wheel.
Figure 6:
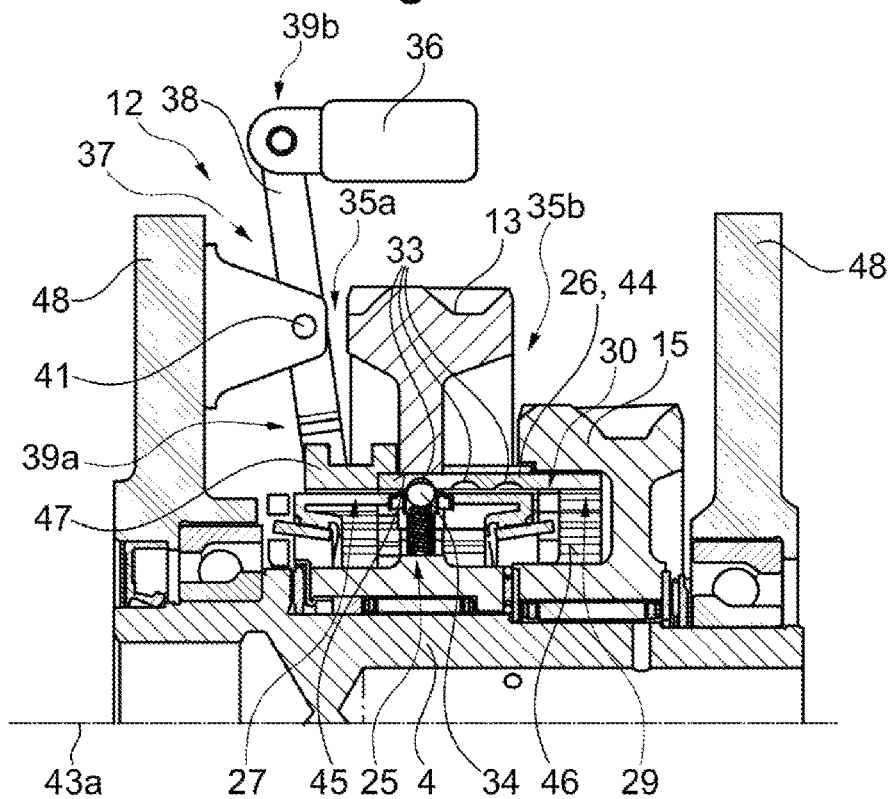
FIG. 6 is a longitudinal sectional view of the shifting device, similar to FIG. 3, with the sliding sleeve assuming a third displacement position in which the motor shaft is rotationally decoupled from the first gear wheel and the second gear wheel compared to FIG. 5.

According to the disclosure, the shifting device 12 is operatively inserted between the motor shaft 4 and the two rotor shafts 5, 7, namely the two gear wheels 13 and 15 coupled to the rotor shafts 5, 7. The shifting device 12 shown in more detail in FIG. 3 is designed in principle in such a way that in its first shifting position it rotationally couples/connects the motor shaft 4 to the first rotor shaft 5, while the second rotor shaft 7 is rotationally decoupled from the motor shaft 4 (as well as the first rotor shaft 5) (FIG. 3). In a second shifting position of the shifting device 12, the motor shaft 4 is rotationally connected/coupled to both the first rotor shaft 5 and the second rotor shaft 7 (FIG. 5). In a third shifting position of the shifting device 12, the two rotor shafts 5, 7 are rotationally connected/coupled to each other, while the motor shaft 4 is rotationally decoupled from the two rotor shafts 5, 7 (FIG. 6).

The shifting device 12 is at least partially integrated directly in the first gear wheel 13. The shifting device 12 has a sliding sleeve 26, which is received in the first gear wheel 13 so as to be axially displaceable along the central first axis of rotation 43a. By displacing this sliding sleeve 26 into different displacement positions, the shifting devices shown in FIGS. 3, 5 and 6 of the shifting device 12 can be realized. The sliding sleeve 26 has a base body 44 that is slidably received directly in a receiving hole 45 in the form of a through hole within the first gear 13. The sliding sleeve 26 is also directly coupled to the first gear 13 in a rotationally fixed manner. The sliding sleeve 26 has internal teeth 46 that interact with various transmission areas 28, 30 on the motor shaft 4 and the second gear 15. In addition to the base body 44, the sliding sleeve 26 has a sliding part 47 associated therewith, which sliding part 47 is connected to a first end 39a of a lever element 38. The sliding part 47 has a receiving contour 40 towards its radial outer side, in which the first end 39a engages positively. The sliding part 47 is attached to the base body 44. The internal toothing 46, which is implemented as axial toothing/serration, is incorporated continuously in the sliding part 47 and the base body 44.

The lever element 38 is part of a lever mechanism 37, which is used to couple an actuator 36 implemented as a linear motor to the sliding sleeve 26. The lever element 38 is rotatably/pivotally supported on a housing 48 with respect to a pivot point 41. A second end 39b of the lever element 38 opposite the first end 39a is in direct operative relationship with the actuator 36. Thus, the sliding sleeve 26 can be adjusted in its displacement position by the actuator 36.

The sliding sleeve 26 has a first connection region 27, which here represents a first toothing region of the internal toothing 46. The first connection area 27 can be positively coupled in the direction of rotation with a first transmission area 28 (also realized as a toothed area) on the part of the motor shaft 4. In the first shifting position shown in FIG. 3 (corresponding to first displacement position of the sliding sleeve 26), the motor shaft 4 is connected to the first gear wheel 13 in a rotationally fixed manner by meshing of the first transmission area 28 in the first connection area 27. FIG. 5 shows the second shifting position of the shifting device 12 (corresponding to a second displacement position of the sliding sleeve 26), in which both the first connection area 27 is connected to the first transmission area 28 in a rotationally fixed manner and a second connection area 29 (also realized as a toothed area) of the sliding sleeve 26 is located in a rotationally fixed manner with a second transmission area 30 (also realized as a toothed area) of the second gear wheel 15. While the first connection area 27 is preferably realized by the sliding part 47, the second connection area 29 is preferably realized directly by the base body 44. According to the third shifting position of the shifting device 12 shown in FIG. 6 (corresponding to a third shifting position of the sliding sleeve 26), the two gears 13 and 15 are finally connected to one another in a rotationally fixed manner, with the motor shaft 4 from the first gear 13 and thus also from the second gear 15 is rotationally decoupled. Thus, the sliding sleeve 26 is out of mesh with the first transmission section 28 with its first connection section 27.

Referring to FIGS. 3, 5 and 6, it can also be seen that a detent unit 25 is provided to support the sliding sleeve 26 in the respective displacement position. The detent unit 25 is also integrated in the first gear wheel 13. The detent unit 25 has a detent element 34 that is radially displaceably arranged in the first gear 13 and cooperates with a detent contour 33 in the sliding sleeve 26. The detent element 34 supports the sliding sleeve 26 in its respective displacement position in a displacement-resistant manner relative to the first gear wheel 13.

As also shown in FIGS. 3, 5 and 6, in the embodiments, the motor shaft 4 is rotatably mounted relative to the housing 48 in a typical manner. Between two support bearings 49 on which the motor shaft 4 is supported relative to the housing 48, the two first and second gear wheels 13, 15 are mounted on the outside of the motor shaft 4 so as to be relatively rotatable. The second gear wheel 15/the second transmission area 30 is located on a second axial side 35b of the first gear wheel 13, which faces away from the first transmission area 28 arranged towards a first axial side 35a.

Thus, according to the disclosure, the operating states illustrated in FIG. 4 can be implemented by the drive system 1. In FIG. 4, the term "internal combustion engine" generally refers to the engine shaft 4 coupled to the internal combustion engine 3, the term "generator" refers to the first gear wheel 13, and the term "output" refers to the second gear wheel 15. In a typical serial drive mode (in the first shifting position of the shifting device 12), the internal combustion engine 3 drives the first electric motor 6, which in turn electrically supplies the second electric motor 8 with drive energy. The second electric motor 8 applies torque to the wheels 9a, 9b. The first electric motor 6 is used to generate a corresponding electrical energy, which is temporarily stored in a battery. An electric driving state with the internal combustion engine 3 decoupled (according to the third shifting position of the shifting device 12) is effected by operating the second electric motor 8 (with an electric energy from the battery). An internal combustion engine driving state typically occurs in the second shifting position of the shifting device 12 by coupling both the internal combustion engine 3, the first electric motor 6 and the second electric motor 8 to the first gear 13. Stationary charging typically also takes place in the first shifting position.

Figure 2:
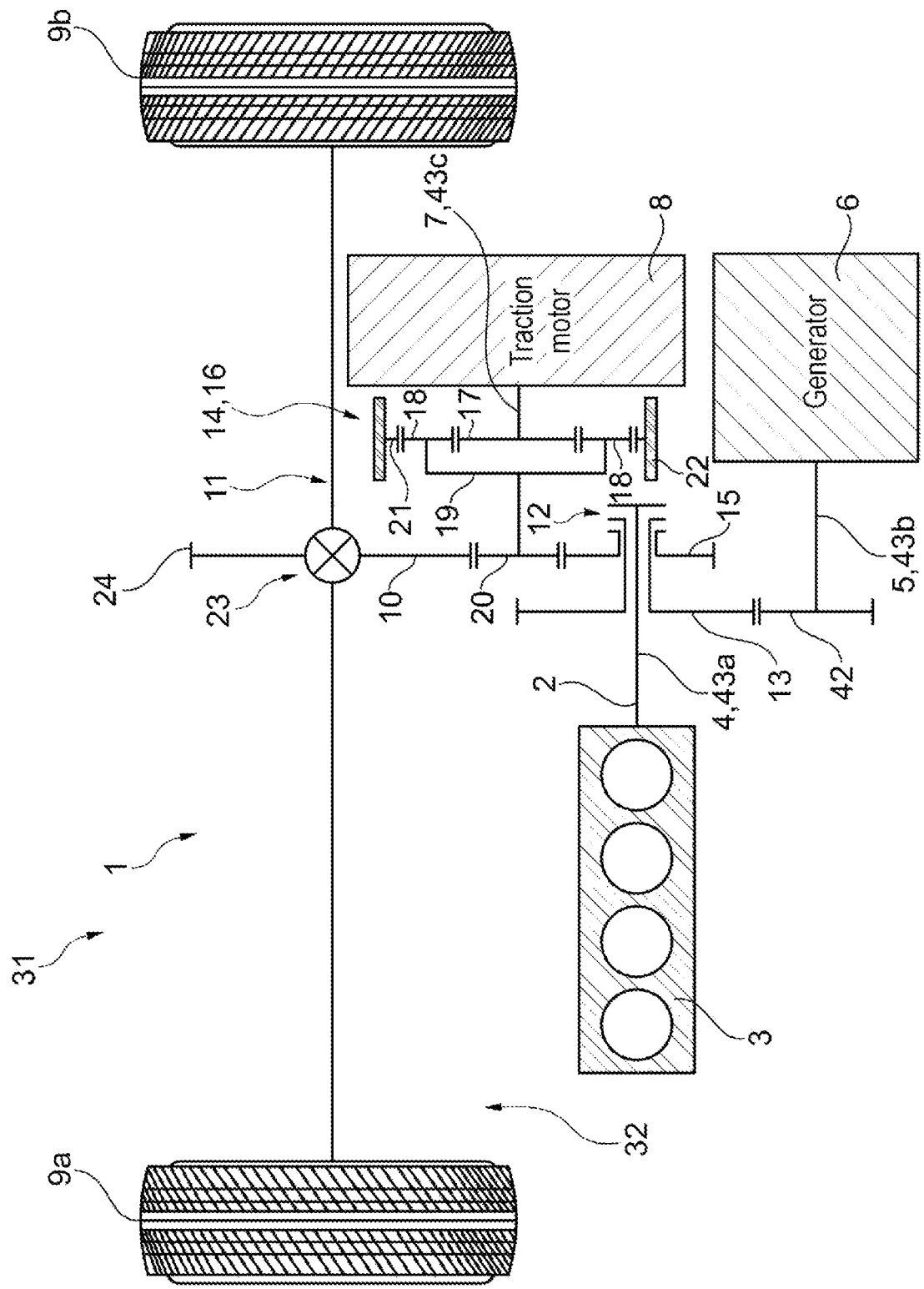
FIG. 2 is a schematic sectional view of a drive system according to the disclosure according to a second embodiment, which differs from the first embodiment essentially in the arrangement of an intermediate gear coupled to a second electric motor.

Finally, referring to FIG. 2, a further preferred second embodiment is realized, which is implemented essentially in accordance with the first embodiment. For the sake of brevity, therefore, only the differences from these two embodiment examples will be discussed. As can be seen in FIG. 2, the second gear wheel 15 is no longer in direct meshing engagement with the drive part 10, but is in indirect rotary connection with the drive part 10 with the interposition of the intermediate gear wheel 20. Conversely, the intermediate gear wheel 20 is thus in direct meshing engagement with the drive part 10 and the second gear wheel 15. Also, the two electric motors 6, 8 are now arranged in opposite directions with respect to the first axis of rotation 43a compared to FIG. 2, with the second electric motor 8 together with the planetary splitter gear 16 being arranged closer to the drive axis 32 than the first electric motor 6.

In other words, the drive system 1 according to the disclosure provides a structure for hybrid vehicles which provides a direct combustion engine through-drive to the wheel 9a, 9b. For such vehicle or transmission concepts, the following driving modes are to be represented: A) Serial driving: Combustion engine 3 and generator 6 generate electrical energy to power traction motor 8; B) Electric driving from battery, with combustion engine 3 disconnected; C) Combustion engine operation: Combustion engine 3 is directly connected to wheels 9a, 9b; D) Stationary charging: as A), only with vehicle 31 stationary. The individual driving modes and shifting states of shifting element 12 are shown graphically in the table according to FIG. 4. It can be seen that the generator 6 is active in each of the driving modes and thus represents a central element of the superstructure/drive system 1. As a result, a technical design for connecting the inputs and outputs is possible using, for example, two connecting elements 27, 29. In this case, the first connecting element 27 is arranged between the motor shaft 4 and the first gear wheel 13, and the second connecting element 29 is arranged between the first gear wheel 13 and the second gear wheel. All types of positive or frictional, hydrostatic, magnetic or other connections are also conceivable. It is particularly advantageous to use a system that is compatible with FIGS. 3, 5 and 6, which requires only one actuator system 36 for actuation.

The shifting element 12 is designed on the basis of a double shifting synchronization. In contrast to a conventional configuration, this does not have a neutral position but connects all three elements 4, 13, 15 in the center position. In FIG. 3, the sliding sleeve 26 is located on the left. Thus, a serial operation is implemented, a connection of combustion engine 3 with generator 6 is present. In FIG. 5, the sliding sleeve 26 is centered. This enables internal combustion operation in which the internal combustion engine 3 is connected to the wheels 9a, 9b and the generator 6. In FIG. 6, the sliding sleeve is on the right. In this case, electric driving from a battery is possible, with the generator 6 connected to the output. The shifting element 12 consists of two synchronization units with the associated synchro gears as well as a sliding sleeve 12 with engagement for the actuating element and a locking device 25 for the individual shifting positions. The locking elements 34 are integrated in the first gear 13. The gear wheel 13 is provided with through-holes, whereby the sliding sleeve 26 connects both lateral elements and can still be actuated with only one actuation system.

LIST OF REFERENCE SYMBOLS

1 Drive system
2 Output shaft
3 Internal combustion engine
4 Motor shaft
5 First rotor shaft
6 First electric motor
7 Second rotor shaft
8 Second electric motor
9a First wheel
9b Second wheel
10 Drive part
11 Gear unit
12 Shifting device
13 First gear wheel
14 Planetary gear stage
15 Second gear wheel
16 Planetary splitter gear
17 Sun gear
18 Planetary gear
19 Planetary carrier
20 Intermediate gear wheel
21 Hollow gear
22 Brake device
23 Differential gear
24 Toothing
25 Docking unit
26 Sliding sleeve
27 First connection area
28 First transmission range
29 Second toothing region
30 Second transmission area
31 Motor vehicle
32 Drive axle
33 Detent contour
34 Detent element
35a First side
35b Second side
36 Actuator
37 Lever mechanism
38 Lever element
39a First end
39b Second flange element
40 Receiving contour
41 Pivot point
42 Third braking element
43a First axis of rotation
43b Second axis of rotation
43c Third axis of rotation
44 Base body
45 Receiving hole
46 Internal toothing
47 Sliding part
48 Housing
49 Support bearing

The invention claimed is:

1. A shifting device for a hybrid drive system of a motor vehicle, the shifting device comprising:
a centrally arranged shaft;
a first gear wheel rotatably mounted relative to the shaft;
a second gear wheel rotatably mounted relative to the shaft and offset along the shaft relative to the first gear wheel; and
a sliding sleeve received directly in a receiving hole in the first gear wheel so as to be displaceable within and connected to the first gear wheel in a rotationally fixed manner, the sliding sleeve is configured such that:
in a first displacement position, the sliding sleeve connects the shaft in a rotationally fixed manner to the first gear wheel, while the second gear wheel is rotationally decoupled from the shaft,
in a second displacement position, the sliding sleeve connects the shaft in a rotationally fixed manner both to the first gear wheel and to the second gear wheel, and
in a third displacement position, the sliding sleeve connects the two gear wheels to one another in a rotationally fixed manner, while the shaft is rotationally decoupled from the two gear wheels.

2. The shifting device according to claim 1, wherein the sliding sleeve has a detent contour, and a detent element lockingly engages in the detent contour in respective ones of the displacement positions.

3. The shifting device according to claim 2, wherein the detent element is received in the first gear wheel.

4. The shifting device according to claim 1, wherein the sliding sleeve has a first connecting region interacting with the shaft and a second connecting region interacting with the second gear wheel and arranged axially offset from the first connecting region.

5. The shifting device according to claim 4, wherein a transmission region of the shaft, which is couplable to the first connecting region, is arranged towards a first axial side of the first gear wheel, and a transmission region of the second gear wheel, which is couplable to the second connecting region, is arranged towards a second axial side of the first gear wheel, which faces away from the first axial side.

6. The shifting device according to claim 1, further comprising an actuator that acts in a displacing manner on the sliding sleeve via a lever mechanism.

7. The shifting device according to claim 6, wherein a lever element of the lever mechanism engages with a first end in a receiving contour on the sliding sleeve and is configured to be acted upon with a second end opposite the first end by the actuator for pivoting about a pivot point fixed to a housing.

8. A drive system for a hybrid motor, comprising:
a motor shaft which is couplable or coupled in a rotational manner to an output shaft of an internal combustion engine,
a first electric motor which has a first rotor shaft and is operated as a generator in a main operating state,
a second electric motor which has a second rotor shaft which is arranged radially offset with respect to the first rotor shaft and is operated as a drive motor in the main operating state,
a drive part which is rotationally connected to the second rotor shaft and is connectable to at least one wheel of the motor vehicle,
a shiftable transmission unit which is operatively inserted between the motor shaft, the two rotor shafts and the drive part, and the shifting device according to claim 1 is configured for controlling a shift position of the transmission unit, with the first gear wheel permanently coupled in rotation with the first rotor shaft and the second gear wheel permanently coupled in rotation with the second rotor shaft via an additional planetary gear stage such that the shifting device is inserted between the motor shaft, the first rotor shaft and the second rotor shaft, wherein in a first shifting position, the shifting device rotationally connects the motor shaft to the first rotor shaft, while the second rotor shaft is rotationally decoupled from the motor shaft, in a second shifting position, the shifting device rotationally connects the motor shaft to both the first rotor shaft and the second rotor shaft, and in a third shifting position, the shifting device rotationally connects the two rotor shafts to one another while the motor shaft is rotationally decoupled from the two rotor shafts.

9. The drive system according to claim 8, wherein the planetary gear stage is formed by a planetary splitter gear including a sun gear permanently connected directly to the second rotor shaft, a planet carrier bearing multiple planet gears connected to an intermediate gear which is in mesh with the second gear wheel, and a hollow gear configured to be fixed to the vehicle frame by a brake device.

10. A motor vehicle having a drive system according to claim 8, wherein the drive part is rotationally coupled to the wheels of the motor vehicle.

11. A shifting device for a hybrid drive system of a motor vehicle, the shifting device comprising:
    a centrally arranged shaft;
    a first gear wheel rotatably mounted relative to the shaft;
    a second gear wheel rotatably mounted relative to the shaft and offset along the shaft relative to the first gear wheel;
    a displaceable sliding sleeve positioned radially inward of and connected to the first gear wheel in a rotationally fixed manner, the sliding sleeve is configured such that:
      in a first displacement position, the sliding sleeve connects the shaft in a rotationally fixed manner to the first gear wheel, while the second gear wheel is rotationally decoupled from the shaft,
      in a second displacement position, the sliding sleeve connects the shaft in a rotationally fixed manner both to the first gear wheel and to the second gear wheel, and
      in a third displacement position, the sliding sleeve connects the two gear wheels to one another in a rotationally fixed manner, while the shaft is rotationally decoupled from the two gear wheels.

12. The shifting device according to claim 11, wherein the sliding sleeve includes detents on an outer contour thereof, and a detent element lockingly engages in respective ones of detents in the first, second, and third-displacement positions.

13. The shifting device according to claim 12, wherein the detent element is received in the first gear wheel.

14. The shifting device according to claim 11, wherein the sliding sleeve has a first connecting region interacting with the shaft and a second connecting region interacting with the second gear wheel and arranged axially offset from the first connecting region.

15. The shifting device according to claim 14, wherein a transmission region of the shaft, which is couplable to the first connecting region, is arranged towards a first axial side of the first gear wheel, and a transmission region of the second gear wheel, which is couplable to the second connecting region, is arranged towards a second axial side of the first gear wheel, which faces away from the first axial side.

16. The shifting device according to claim 11, further comprising an actuator that acts in a displacing manner on the sliding sleeve via a lever.

17. The shifting device according to claim 16, wherein the lever engages with a first end in a receiving contour on the sliding sleeve and is configured to be acted upon with a second end opposite the first end by the actuator for pivoting about a pivot point fixed to a housing.

18. A drive system for a hybrid motor, comprising:
    a motor shaft which is couplable or coupled in a rotational manner to an output shaft of an internal combustion engine,
    a first electric motor which has a first rotor shaft and is operated as a generator in a main operating state,
    a second electric motor which has a second rotor shaft which is arranged radially offset with respect to the first rotor shaft and is operated as a drive motor in the main operating state,
    a drive part which is rotationally connected to the second rotor shaft and is connectable to at least one wheel of the motor vehicle,
    a shiftable transmission unit which is operatively inserted between the motor shaft, the two rotor shafts and the drive part, and
    a shifting device comprising:
      a centrally arranged shaft;
      a first gear wheel rotatably mounted relative to the shaft;
      a second gear wheel rotatably mounted relative to the shaft and offset along the shaft relative to the first gear wheel; and
      a displaceable sliding sleeve connected to the first gear wheel in a rotationally fixed manner, the sliding sleeve is configured such that, in a first displacement position, the sliding sleeve connects the shaft in a rotationally fixed manner to the first gear wheel, while the second gear wheel is rotationally decoupled from the shaft, in a second displacement position, the sliding sleeve connects the shaft in a rotationally fixed manner both to the first gear wheel and to the second gear wheel, and in a third displacement position, the sliding sleeve connects the two gear wheels to one another in a rotationally fixed manner, while the shaft is rotationally decoupled from the two gear wheels;
    wherein the shifting device is configured for controlling a shift position of the transmission unit, with the first gear wheel permanently coupled in rotation with the first rotor shaft and the second gear wheel permanently coupled in rotation with the second rotor shaft via an additional planetary gear stage such that the shifting device is inserted between the motor shaft, the first rotor shaft and the second rotor shaft, wherein in a first shifting position, the shifting device rotationally connects the motor shaft to the first rotor shaft, while the second rotor shaft is rotationally decoupled from the motor shaft, in a second shifting position, the shifting device rotationally connects the motor shaft to both the first rotor shaft and the second rotor shaft, and in a third shifting position, the shifting device rotationally connects the two rotor shafts to one another while the motor shaft is rotationally decoupled from the two rotor shaft.

19. The drive system according to claim 18, wherein the planetary gear stage is formed by a planetary splitter gear including a sun gear permanently connected directly to the second rotor shaft, a planet carrier bearing multiple planet gears connected to an intermediate gear which is in mesh with the second gear wheel, and a hollow gear configured to be fixed to the vehicle frame by a brake device.

20. A motor vehicle having a drive system according to claim 18, wherein the drive part is rotationally coupled to the wheels of the motor vehicle.

\* \* \* \* \*